Figure 1:
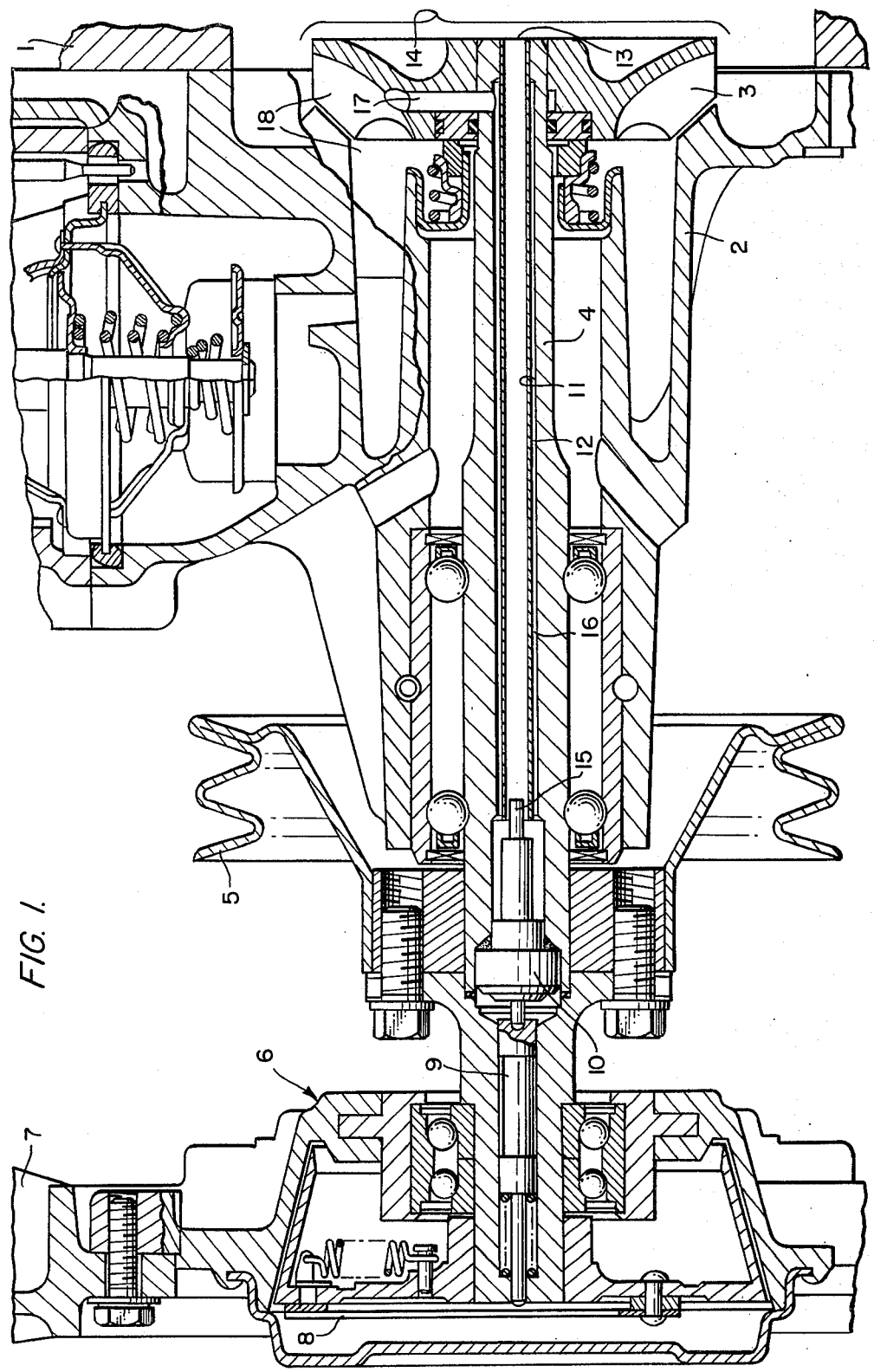

United States Patent [19]

Braatz et al.

[11] Patent Number: 4,467,747

[45] Date of Patent: Aug. 28, 1984

[54] FLUID-FRICTION CLUTCH

[75] Inventors: Andreas Braatz, Rutesheim; Johann Weintz, Freiberg; Wolf-Dieter Kurz, Stuttgart, all of Fed. Rep. of Germany

[73] Assignee: Daimler-Benz Aktiengesellschaft, Fed. Rep. of Germany

[21] Appl. No.: 429,675

[22] Filed: Sep. 30, 1982

[30] Foreign Application Priority Data

Oct. 9, 1981 [DE] Fed. Rep. of Germany ....... 3140195

[51] Int. Cl.³ ............................................. F01P 5/02
[52] U.S. Cl. ............................. 123/41.12; 123/41.46; 192/82 T
[58] Field of Search ............... 123/41.12, 41.44, 41.46, 123/41.49; 192/82 T, 58 B, 113 R, 113 B

[56] References Cited

U.S. PATENT DOCUMENTS

| 3,568,647 | 3/1971 | Adams | 123/41.12 |
| 3,661,237 | 5/1972 | Thompson | 192/58 B |
| 3,749,214 | 7/1973 | Leichliter | 123/41.46 |
| 3,874,347 | 4/1975 | Hovey | 123/41.12 |

Primary Examiner—William A. Cuchlinski, Jr.
Attorney, Agent, or Firm—Craig & Burns

[57] ABSTRACT

A fluid-friction clutch for a cooling fan of an internal combustion engine, the clutch being fitted on the water-pump shaft which drives the impeller of a water pump for the internal combustion engine and being controlled by an expansion-type thermostat element which is located in a longitudinal bore through the water-pump shaft. Cooling water of the internal combustion engine is applied directly to the expansion-type thermostat element, this water being continuously conveyed through the longitudinal bore in the water-pump shaft by utilizing the pressure-difference created in the cooling water by the impeller of the water pump. In order to cool both the working chamber of the fluid-friction clutch and the clutch-bearing, a cooling line is arranged inside the working chamber and connected to the cooling-water circulation inside the longitudinal bore through the water-pump shaft.

4 Claims, 2 Drawing Figures

FLUID-FRICTION CLUTCH

The invention relates to a fluid-friction clutch for the cooling fan of an internal combustion engine, the clutch including a valve lever which controls a valve disposed between a supply chamber and a driving chamber and a temperature-dependent operating element, designed in the form of an expansion-type thermostat element, acting on the valve.

In a device of this general type, known from German Auslegeschrift No. 2,804,557, the expansion-type thermostat element, which serves as the operating element, is heated by means of a resistor having a positive temperature coefficient (PTC resistor). The current supply for the PTC resistor being controlled by a temperature sensor which is designed in the form of an electric switch. The temperature sensor is in thermal contact with the cooling water of an internal combustion engine.

In contrast to this known device, the invention sets out to achieve an arrangement which replaces the known design, whereby the expansion-type thermostat element is influenced indirectly, and in which the thermostat element is in direct communication with the cooling water, in a simple manner, despite the fact that it is located in the region of the fluid-friction clutch, which is also cooled, as is its bearing, by the cooling water. This is achieved, according to the invention, when (a) the fluid-friction clutch is fitted on the water-pump shaft, which drives the impeller of the water pump of the internal combustion engine, (b) the expansion-type thermostat element is mounted in the vicinity of the fluid-friction clutch, in a bore inside the water-pump shaft, this bore being in communication with the cooling water of the internal combustion engine, and (c) means are provided, which enable a stream of cooling water to be continuously directed around the expansion-type thermostat element, utilizing the pressure-difference between the suction side and the pressure side of the water-pump impeller.

Feature (a) enables, first of all, the water-pump drive to be concurrently utilized, in a constructionally simple manner, for the purpose of driving the cooling fan, while feature (b) enables the heat of the cooling water to influence the expansion-type thermostat element directly, and feature (c) ensures that the heat actually present in the cooling system acts on the thermostat element, and that, in the interest of functional reliability and durability, the stream of cooling water cools those parts of the fluid-friction clutch which are subjected to severe thermal conditions, as well as cooling the bearing system for mounting the water-pump shaft.

According to one embodiment of the invention, the means for directing a stream of cooling water around the expansion-type thermostat element, which is located inside the water-pump shaft, can take the form of a tube, which, having an external diameter which is smaller than that of the bore, is fitted inside this bore. The inlet opening of the tube, for supplying the cooling water, being located at the end of the water-pump impeller, on its pressure side, and the outlet opening of this tube being located close to the thermostat element. An annular space is disposed between the bore and the tube and is connected to the suction side of the water-pump impeller by means of at least one hole, the hole being drilled radially through the water-pump impeller.

In another embodiment, the expansion-type thermostat element can be located in the region of the working chamber of the fluid-friction clutch and can act directly on the valve lever. It being possible for the inlet opening of a tube, which forms an extension of the tube inside the water-pump shaft, to be sealed-off relative to a bore which forms an extension of the bore inside the water-pump shaft, and for the bore to be connected, in the region of the thermostat element to an annular space leading, as an extension of the annular space inside the water-pump shaft, to the suction side of the water-pump impeller. The connection of the bore to the annular space being effected through a radially-drilled hole, through a cooling line arranged inside the working chamber and another radially-drilled hole.

In addition to influencing the expansion-type thermostat element directly by the flow of cooling water, the arrangement enables both the working chamber of the fluid-friction clutch and the clutch-bearing to be cooled in a very effective manner.

An object of the invention is, therefore, an improved cooling fan system for an internal combustion engine.

Another object of the invention is an improved control for a cooling fan for an internal combustion engine.

Still another object of the invention is a control for a cooling fan wherein a thermostat located in the vicinity of a fluid-friction clutch for a cooling fan is controlled by water from the cooling system of the internal combustion engine.

Another object of the invention is an improved control for a fluid-friction clutch for a cooling fan of an internal combustion engine whereby an expansion-type thermostat element is influenced indirectly, and in which the thermostat element is in direct communication with the cooling water despite the fact that the thermostat element is located in the region of the fluid-friction clutch, the latter also having its bearing cooled by the cooling water of the internal combustion engine.

Another object of the invention is the production of a control for a cooling fan of an internal combustion engine wherein a fluid-friction clutch is fitted on the water pump shaft, which drives the impeller of the water pump of the internal combustion engine, an expansion-thermostat element being mounted in the vicinity of the fluid-friction clutch, in a bore inside the water-pump shaft, the bore being in communication with the cooling water of the internal combustion engine, and means are provided which enable a stream of cooling water to be continuously directed around the expansion-thermostat element, utilizing the pressure difference between the suction side and the pressure side of the water-pump impeller to cool the friction clutch.

Another object of the invention is to produce a fluid-friction clutch for a cooling fan of an internal combustion engine wherein an expansion-thermostat element is located in the region of the working chamber of the clutch. The expansion-thermostat element acting directly on a valve lever, the outlet opening of a tube being formed as an extension of a tube from the cooling system and being sealed off relative to a bore which forms an extension of a bore serving as an input of cooling water from the cooling system, in the region of the expansion-thermostat element. An annular space around the expansion-thermostat element being connected to the suction side of the water-pump impeller of the cooling system, the connection being effected through a radially-drilled hole, through a cooling line which is arranged inside the working chamber and another radially-drilled hole in the water pump impeller shaft.

Figure 2:
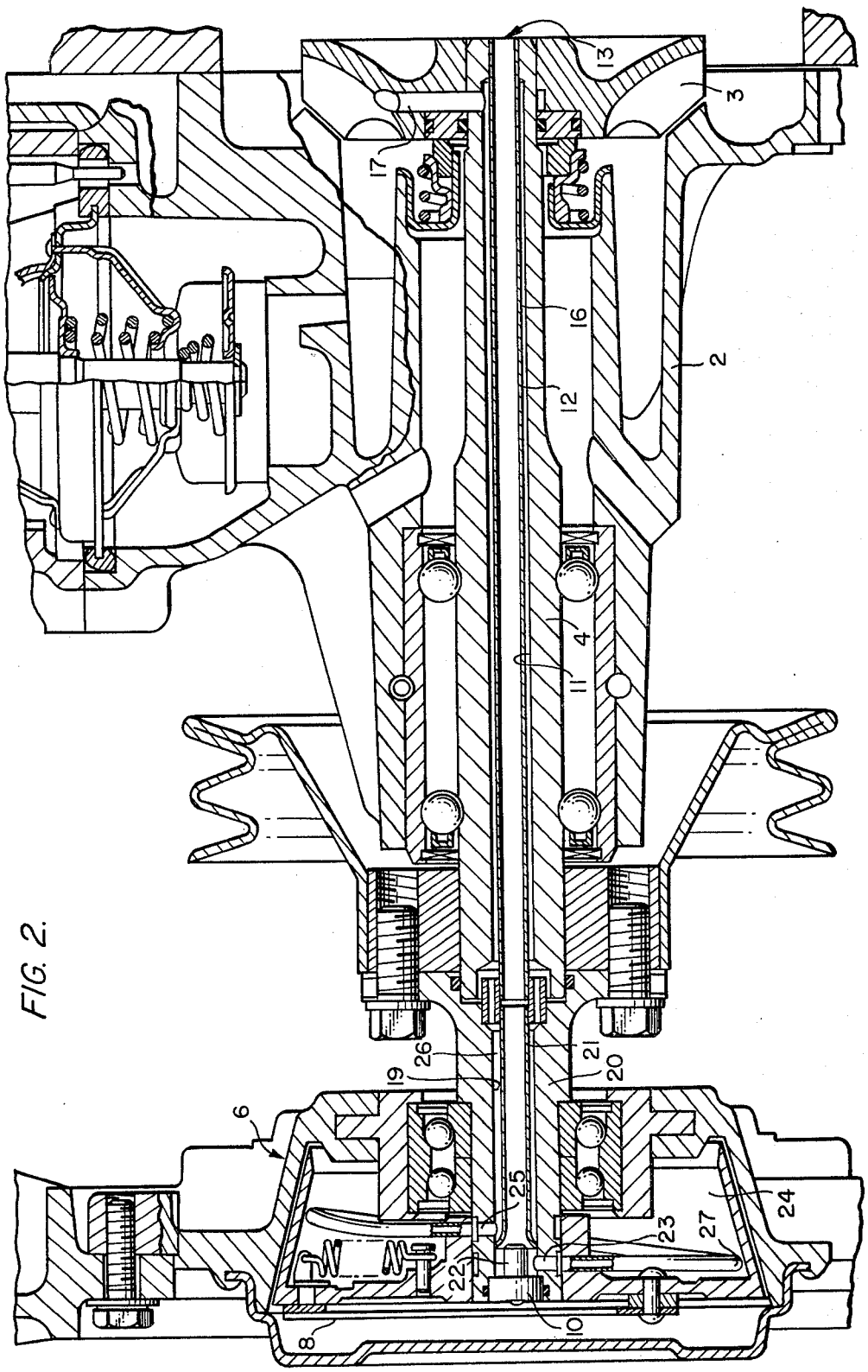

These and other objects, features, and advantages of the present invention will become more apparent from the following description when taken in connection with the accompanying drawings which show, for the purposes of illustration only, one embodiment in accordance with the present invention, and wherein:

FIG. 1 shows a longitudinal section through the water pump of an internal combustion engine and a fluid-friction clutch for a cooling fan, the clutch being fitted on the water-pump shaft including and means for ducting the cooling water inside the water-pump shaft, and FIG. 2 shows a longitudinal section corresponding to FIG. 1, with means for ducting the cooling water through the working chamber of the fluid-friction clutch.

As shown in FIG. 1, the casing 2 of a water pump is flange-fitted to an internal combustion engine 1, which is merely indicated, the water-pump shaft 4, carrying the water-pump impeller 3, being mounted inside the casing 2. The water-pump shaft 4 is provided with a belt-pulley 5, to permit the water pump to be belt-driven from the crankshaft of the internal combustion engine. In order to operate a cooling fan 7, a fluid-friction clutch 6, of a known type, is fitted on the water-pump shaft 4, in front of the belt-pulley 5. A valve lever 8, inside the fluid-friction clutch 6, controls a valve between a supply chamber and a driving chamber. An expansion-type thermostat element 10 acts, via a push-pin 9, on the valve lever 8. The thermostat element 10 being mounted in a bore 11 through the water-pump shaft 4, the bore being in communication with the cooling water of the internal combustion engine. A tube 12 is fitted inside the bore 11, the tube having an external diameter which is smaller than the diameter of the bore 11. The inlet cross-section 13 of the tube 12, is located at the end of the water-pump impeller 3, on its pressure side 14. The outlet cross-section 15 of the tube 12 is located close to the expansion-type thermostat element 10. In the region of the water-pump impeller 3, the annular space 16, between the bore 11 and the tube 12, is connected to the suction side 18 of the water-pump impeller 3 by means of a hole 17 which is drilled radially through the water-pump impeller.

When the internal combustion engine is running, and its water pump is accordingly operating, the pressure-difference at the water-pump impeller 3 is utilized to direct cooling water, from the pressure side 14, through the inlet cross-section 13, through the tube 12, and onto the expansion-type thermostat element 10. The water is then pumped through the annular space 16 and outwards, through the radially-drilled hole 17, to the suction side 18 of the water-pump impeller. As a result, cooling water is applied directly to the expansion-type thermostat element 10, the heat of this water corresponding to that of the cooling water which is present in the region of the water pump. Since the expansion-type thermostat element 10 is mounted near the fluid-friction clutch, the latter is cooled by the cooling water.

A design according to FIG. 2 is recommended for fluid-friction clutches which are subjected to very severe thermal conditions. The expansion-type thermostat element 10 is mounted in a bore 19 through the shaft 20 for the fluid-friction clutch 6, the shaft being flange-attached to the water-pump shaft 4. The bore 19 forms an extension of the bore 11. A tube 21 forms an extension of the tube 12, which is located in the bore 11, the tube 21 extending as far as the expansion-type thermostat element 10, where it is expanded to an extent such that it seals off the bore 19. A radially-drilled hole 23 leads into the working chamber 24 of the fluid-friction clutch 6, the hole 23 leading from the space 22, in the region of the thermostat element. Space 22 being in communication with the cooling water in the water-pump, via the tubes 12 and 21. Another radially-drilled hole 25 leaves the working chamber 24, and leads to the annular space 26 behind the expanded portion of the tube 21, this annular space forming an extension of the annular space 16. The two radially-drilled holes, 23 and 25, are connected by a cooling line 27, which is arranged inside the working chamber 24.

While we have shown and described only two embodiments in accordance with the present invention, it is understood that the invention is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. a fluid-friction clutch for a cooling fan of an internal combustion engine, having a valve lever means for controlling a valve between a supply chamber and a driving chamber, comprising temperature-dependent operating means including an expansion-type thermostat element acting on the valve lever means, said fluid-friction clutch being fitted on the water-pump shaft driving the impeller of the water pump, said shaft including a first bore, the expansion-type thermostat element being mounted in the vicinity of the fluid-friction clutch in the first bore inside the water-pump shaft, the first bore being in communication with the cooling water of the internal combustion engine, and means for enabling a stream of cooling water to be continuously directed around the expansion-type thermostat element utilizing the pressure-difference between the suction side and the pressure side of the water-pump impeller.

2. A fluid-friction clutch according to claim 1, including first tube means for supplying cooling water, having an external diameter which is smaller than the diameter of said bore, fitted inside said bore in the water-pump shaft, an inlet opening of the first tube means being located at the end of the water-pump impeller, on its pressure side, and an outlet opening of the first tube means being located close to the expansion-type thermostat element, and a first annular space disposed between the first bore and the first tube means being connected to the suction side of the water-pump impeller by means of at least one hole for leading the cooling water away, the hole being drilled radially through the water-pump impeller.

3. A fluid-friction clutch according to claim 1, wherein the expansion-type thermostat element is located in the region of a working chamber in the clutch for acting directly on the valve lever, an outlet opening of another tube means forming an extension of the first tube means being sealed-off relative to a second bore which forms an extension of the first bore and the second bore being connected, in the region of the expansion-type thermostat element, to a second annular space leading as an extension of the first annular space to the suction side of the water-pump impeller, the connection being effected through a first radially-drilled hole and a cooling line which is arranged inside the working chamber and which adjoins the first hole and a second radially-drilled hole in the water-pump shaft.

4. A fan control for an internal combustion engine having a cooling system comprising
 a clutch for said fan,
 a water-pump shaft extending from an impeller for said cooling system,
 thermally responsive means disposed within a working area of said clutch for actuating said clutch in response to a change in temperature of the cooling system; and
 means within the shaft and extension means for communicating the cooling medium of said cooling system with the thermally responsive means disposed within said working area.

* * * * *